Oct. 18, 1966   H. G. JOHNSON   3,279,230
EXTRUSION APPARATUS AND METHOD
Filed Nov. 12, 1964   4 Sheets-Sheet 2

*INVENTOR:*
Herbert G. Johnson

INVENTOR:
Herbert G. Johnson.

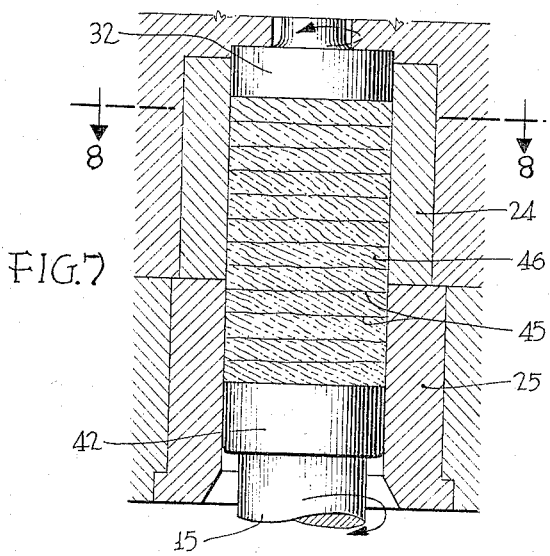
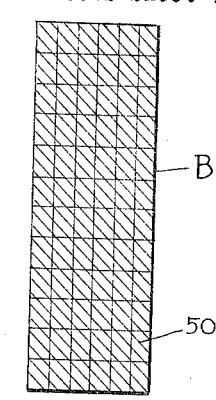
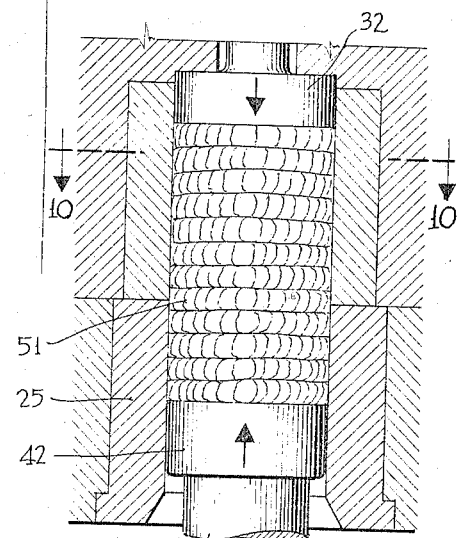
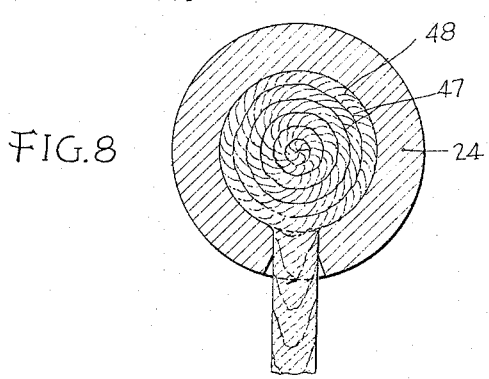
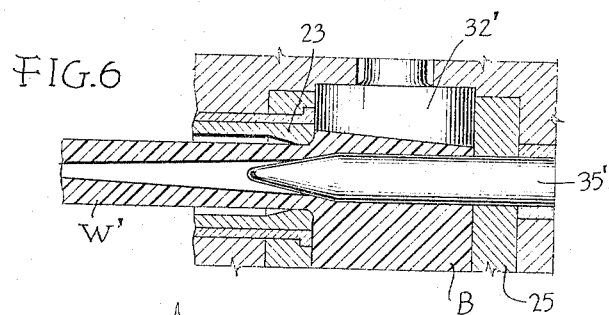
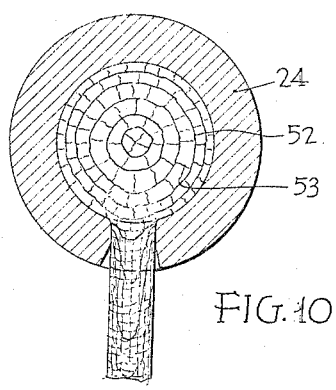
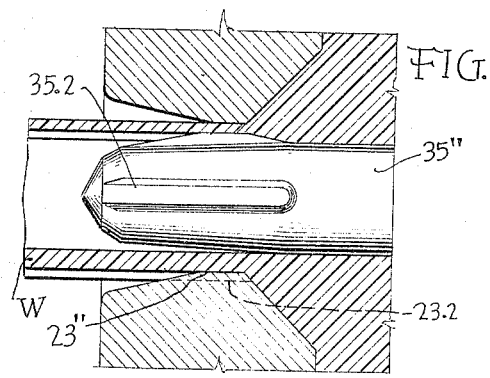

United States Patent Office 3,279,230
Patented Oct. 18, 1966

3,279,230
EXTRUSION APPARATUS AND METHOD
Herbert G. Johnson, 17 N. Drexel Ave., Havertown, Pa.
Filed Nov. 12, 1964, Ser. No. 410,385
19 Claims. (Cl. 72—259)

This application is a continuation-in-part of my copending application, Ser. No. 234,378, filed Oct. 31, 1962, now abandoned.

This invention relates to extrusion apparatus and method and has for an object the provision of improvements in this art.

Many devices for extruding plastic materials to make tubular articles hold a mandrel by means of a spider and force the plastic material through the openings of the spider and over the mandrel to form a tube. This causes trouble at times because the plastic material does not recombine or knit together properly after being divided in passing through the spider. Moreover, there is difficulty in cleaning out the remnant or scrap at the end of an extrusion run. Except with molten metal, the extruding operation is discontinuous or billet-by-billet and here the problem of dealing with billet ends is serious. Most devices cause trouble at the start of each extrusion run.

Another type of extrusion press uses a mandrel which extends entirely through the length of the billet and into the extrusion die in order to avoid spider supporting means for the mandrel, the mandrel sometimes being used to pierce the billet and the billet sometimes being prepierced to receive the mandrel. This requires a very long mandrel and very long ram and mandrel strokes, and besides, such long mandrels have a very short life, especially when of small size.

The present invention provides improved apparatus for extruding in which the material is extruded at an angle to the axis of the billet container and line of movement of the ram; in which the scrap ejecting plunger or ram forms the end of the container during extrusion and moves reversely to the direction of the extruding movement of the extruding ram when ejecting the scrap or remnant; and in which the mandrel moves across through the billet before the start of the extruding action and moves back out of the container space to allow the scrap ejecting plunger to operate.

The invention also provides means and method for compressing a billet axially and expanding it radially prior to extrusion by an amount which will improve its grain, especially when subsequently extruded laterally.

The invention also provides means and method for twisting a billet between its ends as it is shortened and also while it is being extruded to improve the grain.

The invention also provides means and method for working the extruding rod or tube circumferentially while it is being extruded laterally, the tube being worked circumferentially either exteriorly or interiorly, or both, to improve its grain.

The objects of the invention, together with various features of novelty and advantages, will be apparent from the following description of certain exemplary embodiments, reference being made to the accompanying drawings, wherein:

FIG. 6 shows part of the assembly with a modified mandrel and ejection ram;

FIG. 7 is a diagrammatic axial section, with section lines omitted for clarity, illustrating the effect on the billet grain structure produced by ram rotation;

FIG. 8 is a diagrammatic transverse section taken on the line 8—8 of FIG. 7;

FIG. 9 is a diagrammatic axial section, with section lines omitted for clarity, illustrating the effect on the billet grain structure produced by heavy axial upsetting action;

FIG. 10 is a transverse section taken on the line 10—10 of FIG. 9;

FIG. 11 shows a modified form of rotating mandrel and die.

Figure 1:
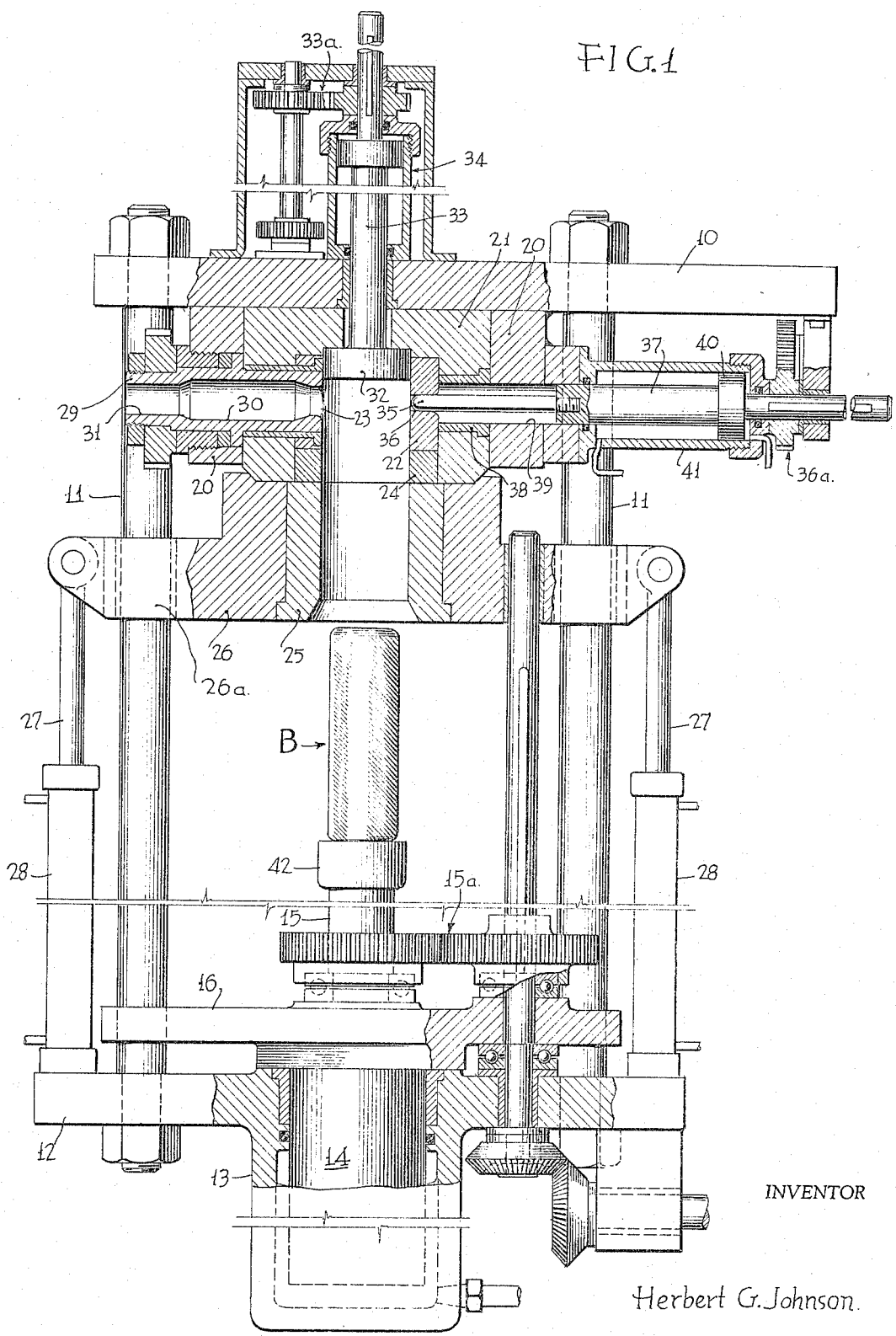
FIG. 1 is a vertical axial section of an extrusion press embodying the invention.

As shown in FIG. 1, the extrusion press includes a reaction base 10 carried by columns 11 which at the other end carry a frame 12 supporting an extrusion ram cylinder 13 for a ram piston 14 carrying an extrusion ram 15. If desired, the ram may be rotated, as by splined shaft and driven gearing 15a. The ram 15 is guided by a crosshead 16 slidable on the columns 11.

The base 10 carries a frame ring 20 which is tightly secured to a die supporting block 21 carrying a continuous die ring 22 having a die opening or die orifice proper 23. The die member 22 may be secured in place in the supporting ring 21 by a holding ring 24 force-fitted or otherwise secured to permit change of die members when desired.

A movable billet container 25 is provided to cooperate with the extrusion space in the die ring and its holding ring. The movable container could be made integral with the base parts but preferably, as shown, is made as a separate part carried by a container supporting ring frame 26 mounted on a crosshead 26a for sliding movement on the columns 11. The container and its frame 26 may be operated by piston rods 27 of pistons operating in fixed cylinders 28.

The die ring orifice is flared outward beyond the die orifice proper 23; and a rotary die sleeve 29 turnable in the die blocks 21 and the frame ring 20 is provided with oversized openings 30 and 31, respectively, for the outward movement of the extrusion piece or stock which is formed.

The bottom of the die cavity is formed by an ejection ram head 32 which in FIG. 1 is shown to be square on the end and rotary but which, as shown at 32' in FIG. 6, is inclined on the end surface to have a shearing action and also provide more depth for metal or other extrusion material on the side toward the die orifice. Of course, the ram head of FIG. 1 will also shear off the extruding material. The back of the ejection ram bottoms in a cavity in the die block 21 to take the extruding reaction; and a piston rod 33 is provided for the head for operation by suitable reciprocating power means, such as a ram piston-cylinder device 34. Means 33a are provided for rotating the ejection ram 33.

The assembly as thus far described is useful for making solid bars, the size and shape depending on the size and shape of the die orifice. There may be more than one die orifice if desired.

For making tubular rod stock a mandrel 35 is provided for movement through a close fitting opening 36 in the die ring member 22 diametrically opposite and aligned with the die orifice 23. The mandrel is carried by a mandrel ram piston rod 37 movable through the opening of a bushing 38 secured in the block 21 and an opening 39 in the frame ring 20. The mandrel is operated by a piston 40 in a cylinder 41 powered for action in both directions. If desired and as shown, the mandrel is rotated, as by a spline and gear drive 36a.

The mandrel is long enough to pierce through the diameter of a billet B and extend into the die orifice for the desired distance.

A dummy block 42 carried by the extrusion ram 15 acts against the billet during extrusion. The dummy block is preferably secured to the ram if it rotates.

In operation, as shown in FIGS. 2 to 5, a billet B is placed in the container 25, as by being pushed upward therein by the ram 15 and the dummy block 42 when the open end of a container faces downward. If the container opening faces upward the billet may be placed therein by lift means and the dummy block and ram then brought down.

Figure 2:
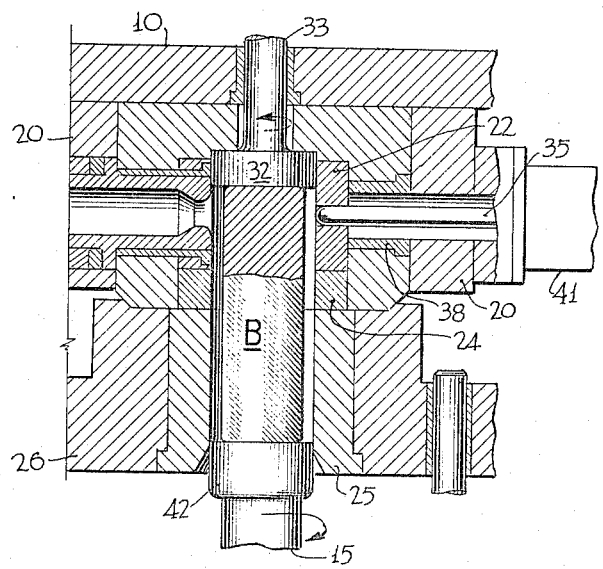
FIG. 2 is a partial vertical section showing a billet inserted for extrusion.

After the billet has been placed in the container, as shown in FIG. 2, the extrusion ram is operated to squeeze the billet to cause it to fill the space inside. This gives the benefit, in case metal is the material being extruded, of working and refining the grain. The grain improvement is marked at and above 25% reduction in length of the billet. The grain is also improved by the side extrusion action hereby provided.

Figure 3:
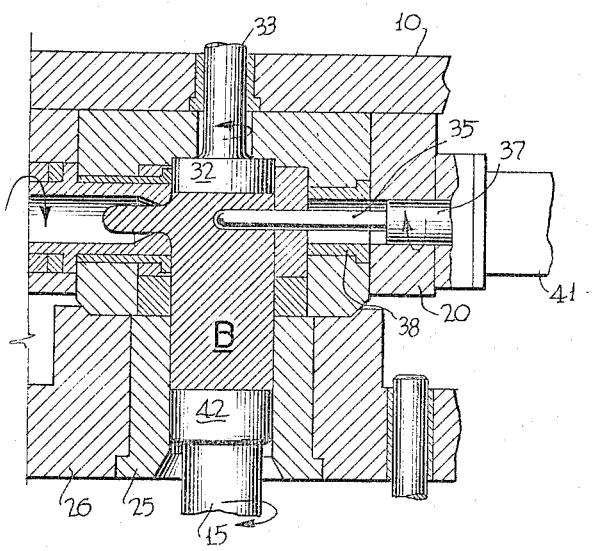
FIG. 3 is a view like FIG. 2 but showing the billet compressed by the ram and the mandrel entered part way through the billet.

Next, as shown in FIG. 3, the mandrel 35 is pushed across through the billet while the ram pressure is maintained to start the flow of metal or other extrusion material which may be present through the die orifice.

Figure 4:
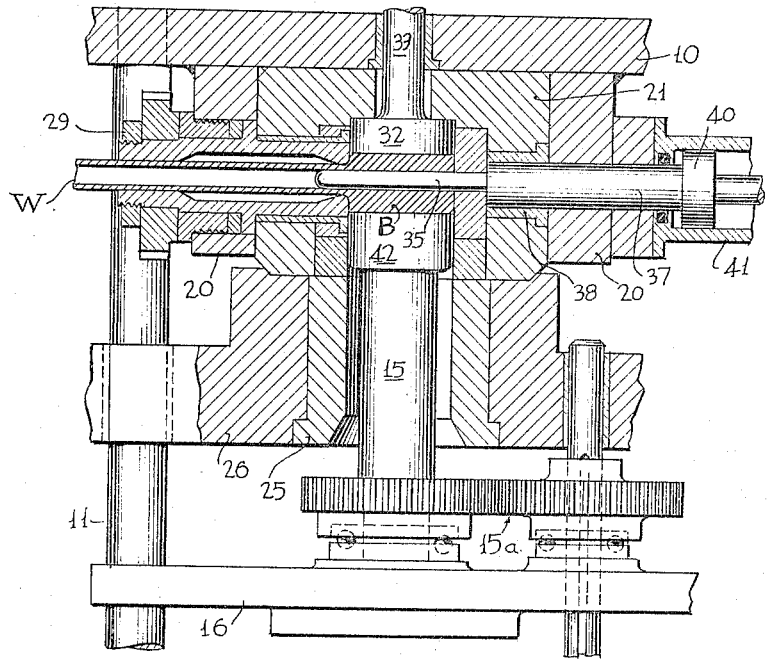
FIG. 4 is a view like FIG. 2 but showing the parts at the completion of extrusion.

Then, as shown in FIG. 4, the mandrel enters the die orifice for the desired distance and causes tubular stock W to be formed. It has been found that the mandrel automatically seeks a central position in the die orifice and that very concentric action and tubing of uniform wall thickness are attained.

By making the mandrel longer and tapered on the end, as shown at 35' in FIG. 6, it is possible to make tubing W' of different wall thickness or, if desired, by gradually pulling back the mandrel during extrusion, it is possible to make a length of tubing of tapered wall thickness along its length.

By providing a mandrel 35 of proper shape, as with ribs or grooves, ribs 35.2 being shown in FIG. 11, it is possible to make tubing with interior ribs or grooves; by providing a die 23'' with an orifice of proper shape, as with ribs or grooves, grooves 23.2 being shown in FIG. 11, it is possible to make tubing with exterior ribs or grooves; and by making both mandrel and die orifice of proper shape it is possible to make tubing with both interior and exterior ribs or grooves. For making such shapes the mandrel and die are held against rotation. Otherwise the ribbing or grooving on a rotating mandrel or die will aid in circumferential grain working, as will be explained hereinafter.

Figure 5:
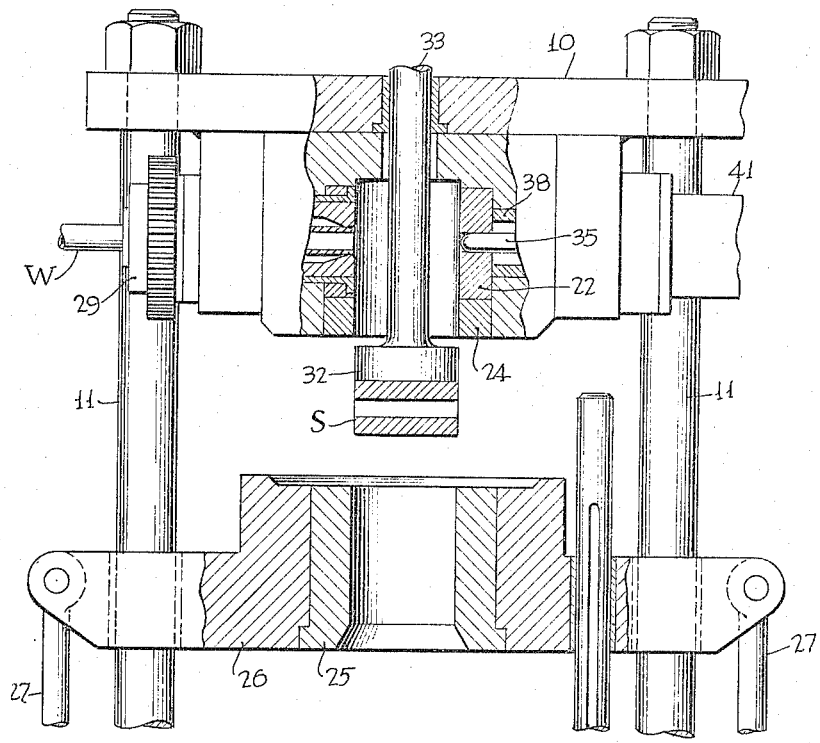
FIG. 5 is a view like FIG. 2 but showing the scrap slug being removed.

After as much of the billet has been extruded as is practicable the extruding action is halted, as shown in FIG. 4, and the extrusion ram 15 is retracted. Then, as shown in FIG. 5, the mandrel 35 is retracted until the space inside is entirely cleared and the scrap ejection ram 32 is operated to eject the scrap slug S from the container space. The removal of the container 25 for this action reduces the length of stroke needed for the extrusion ram. This reduces the length of the apparatus as a whole and speeds up the overall operating time.

It is obvious that the side extrusion of a vertical press saves much floor space and does not require the height needed for the vertical extrusion of long lengths of material.

The mandrel required is relatively short, merely the length of the diameter of the billet plus whatever more length is needed to form the tube, hence the mandrel, though small, will be relatively stiff and rigid for piercing the billet. There will be no spider die required although the action is much nearer that which can be realized with a spider die, where feasible for a product which will re-knit, than with long mandrels which must extend through the full length of the billet; yet the difficulties encountered with spider dies are completely avoided.

The apparatus is suitable for extruding metals, plastics, ceramics, and various other materials, both at normal temperatures and at elevated temperatures. When metals are extruded they are preferably kept below the recrystallization temperature. Some metals, such as aluminum, can be extruded at room temperature.

The short mandrel which is hereby made possible has special advantages in high temperature extruding where it is almost impossible to use a long mandrel which extends through the full length of the billet and consequently becomes stuck fast in the billet and heats up too much; and which if cooled by fluid circulating therethrough will chill the billet metal therealong and restrict the proper metal flow. With the present apparatus, on the contrary, the mandrel is short and is, like the die orifice, located where the metal is flowing past, hence cooling of both the die orifice and the mandrel, especially at the tip where most needed, is entirely practicable and advantageous. It is not necessary to illustrate cooling arrangements to appreciate these advantages obtained with the present apparatus.

By rotating the die the outer surface of the extruded strip or rod (the term including tubing) is worked to break up the longitudinal directional grain pattern normally imparted by die extrusion; by rotating the mandrel when tubing is being formed the interior surface is similarly worked and given a circumferential orientation; and by rotating both the die and mandrel the tube is worked both interiorly and exteriorly. Preferably the die and mandrel are rotated in opposite directions to balance the action on the tube. If the die and mandrel are ribbed, as illustrated, the working action on the grain is increased; but attention is given to keep the ribbing below that which would tear the metal. The rotary action of the mandrel aids in penetration through the billet.

When the billet is reduced in length appreciably (25% or more) before extrusion and twisted by counter-rotating rams, as shown, the grain structure is beneficially reoriented and when this action is combined with rotary action of the die or mandrel, or both, during extrusion, an article is formed which has practically uniform strength in all directions, the grain structure being particularly improved.

FIGS. 7 and 8 indicate diagrammatically how the grain structure is refined by counter-rotating rams; FIGS. 9 and 10 indicate diagrammatically how end compression before extruding refines the grain structure; the effect carrying through into the extruded rod, as shown in FIG. 10.

In FIGS. 7 and 8 the oppositely rotating rams 32 and 15–42 tend to work the grain circumferentially in transverse and concentric lines, indicated by vertically spaced transverse lines 45 and inclined lines 46, FIG. 7, and by concentric circles 47 and inclined lines 48, FIG. 8.

In FIGS. 9 and 10 the billet shortening and widening tend to break up the regular-shaped grains, FIG. 9, into smaller random-shaped grains 51, FIG. 9. FIG. 10 illustrates concentric deformation lines 52 and bent lines 53.

As stated, the grain transformation of FIGS. 7 to 10 has been idealized and shown diagrammatically and section lines have been omitted so the idealized form shapes will not be obscured. In practice it has been found by examination of grain shapes of specimens that these idealized grain transformations are attained to a very substantial extent.

It is thus seen that the invention provides new and improved extruding apparatus which is relatively simple yet effective in operation; also a new and improved method of extruding materials.

While certain embodiments of the invention have been illustrated and described, it is to be understood that there may be various embodiments and modifications within the general scope of the invention.

I claim:

1. Extrusion apparatus, comprising in combination, a container having a fixed bottom portion and an extrusion chamber of a size to receive a billet and ram, an ejection ram forming a bottom for said chamber and held in a fixed retracted position in said bottom opening, a complete integral die ring seated in the bottom portion of said container around said ejection ram, said die ring having an extrusion die orifice in a transversely fixed position in the side thereof above said ejection ram when retracted, said container die ring having an opposite mandrel-receiving opening in the side aligned with the die orifice, a opening mandrel mounted for movement through said side opening and through said container chamber into said extrusion die orifice, means for moving said mandrel in and out through said mandrel opening and through a billet in said container, and an extrusion ram mounted for operation in said extrusion chamber to force material of a billet through said side die orifice.

2. Extrusion apparatus, comprising in combination, a container having an extrusion chamber of a size to receive a billet and ram, said container comprising a fixed bottom part having an extrusion die opening in the side thereof and a top part mounted for movement toward and from the bottom part, an ejection ram mounted in a fixed retracted position in and by the bottom of said bottom container part below the side extrusion die opening and having a stroke of sufficient length to push a scrap piece out of the bottom container part, and said top container part having a stroke of sufficient length when retracted to leave a lateral space between the container parts for passage of a scrap piece ejected by said ejection ram, said ejection ram having an angular cutting edge formed at an angle not greater than a right angle.

3. Extrusion apparatus, comprising in combination, a container having an extrusion chamber of a size to receive a billet and ram, said container having a transversely fixed extrusion die in one side thereof above the bottom and on the opposite side having an opposite mandrel opening aligned with said extrusion die opening, an extrusion ram mounted for movement in said extrusion chamber to force material through said side die, and a mandrel mounted at the side of said container and movable through said side mandrel opening, the mandrel having a length and movement sufficient to enter the extrusion die opening when projected and to clear the extrusion chamber when retracted.

4. Extrusion apparatus as set forth in claim 3, in which said container includes an integral complete ring insert at the bottom provided with said aligned extrusion die and mandrel openings.

5. Extrusion apparatus, comprising in combination, a container having a fixed bottom part and a top part mounted for axial reciprocatory movement toward and from the bottom part, the container parts when together forming an extrusion chamber of a size to take a billet and ram, an extrusion ram mounted for movement in said extrusion chamber, said extrusion chamber having an ejection ram seated in the bottom thereof when retracted and movable therethrough for a distance sufficient to eject a billet stump from the bottom part of said container, said container near the bottom above the retracted position of the ejection die having opposite aligned transverse extrusion and mandrel openings, a movable mandrel mounted in said mandrel opening, said mandrel being of such length and stroke that, when projected, its end enters the extrusion opening, and, when retracted, its end is clear of the container chamber, the top container part, when retracted, providing side clearance between the container parts sufficient for the passage therethrough of a scrap stump ejected from the lower container part by the ejection ram.

6. Extrusion apparatus as set forth in claim 5, in which said movable mandrel is tapered at the end to extend into the extrusion opening to variable distances whereby to vary the wall thickness of the tube extruded therefrom.

7. Extrusion apparatus, comprising in combination, a container having a chamber for holding a billet to be extruded, an extrusion ram movable in said container to extrude the billet, said container having a side die opening, and an ejection ram forming, when retracted a bottom of the container below the side opening, one of said rams being rotatable to work the material of the billet and refine its grain during compression and extrusion.

8. Extrusion apparatus, comprising in combination, a container having a chamber for holding a billet to be extruded, an extrusion ram movable in said container to extrude the billet, said container having side die opening, and an ejection ram forming when retracted a bottom of the container below the side opening, said rams being rotatable in opposite directions to work the material of the billet and refine its grain during compression and extrusion.

9. Extrusion apparatus, comprising in combination, a container having an extrusion chamber of a size to receive a billet and ram, said container having an extrusion die in one side thereof above the bottom and on the opposite side having a mandrel opening aligned with said extrusion die opening, an extrusion ram mounted for movement in said extrusion chamber to force material through said side die, and a mandrel mounted at the side of said container and movable through said side mandrel opening, the mandrel having a length and movement sufficient to enter the extrusion die opening when projected and to clear the extrusion chamber when retracted, said mandrel being rotatable to work the material of the tube circumferentially and refine it during extrusion.

10. Apparatus as set forth in claim 9, in which said mandrel is ribbed to increase its working action on the tube.

11. Apparatus as set forth in claim 9, further characterized by the fact that said die is rotatable to work the material of the tube circumferentially and refine it during extrusion.

12. Apparatus as set forth in claim 9, further characterized by the fact that both said die and said mandrel are rotatable and in opposite directions to work the material of the tube and refine it during extrusion.

13. Apparatus as set forth in claim 9, further characterized by the fact that said extrusion ram is rotatable to work and refine the material of the billet as it compresses and extrudes it.

14. Apparatus as set forth in claim 9, which further includes an injection ram closing the end of said container near the extrusion die, said extrusion ram and said ejection ram being rotatable and in opposite directions to work and refine the material of the billet as it compresses and extrudes it.

15. The method of extruding a billet from a container having a side opening containing a die, a mandrel movable across the container chamber diameter from the side opposite the die into the opening of the die, which comprises, compressing a billet into the bottom of the container below the mandrel and die opening while the mandrel is fully withdrawn out of the container chamber, projecting the mandrel through the diameter of the billet after it is fully compressed into the bottom of the container chamber, compressing the billet to extrude most of its bulk through the die opening past said mandrel until only a scrap stump embracing the mandrel is left, withdrawing the mandrel from said stump until it is fully clear of the stump and container chamber, and thereafter ejecting the stump from the container chamber.

16. The method as set forth in claim 15, which further comprises, twisting the billet between its ends during compression and extrusion.

17. The method as set forth in claim 15, which further comprises, twisting the tube between the mandrel and die during extrusion.

18. The method as set forth in claim 15, which further comprises, twisting the billet between its ends during compression and extrusion, and twisting the tube between the mandrel and die during extrusion.

19. The method of extruding a billet from a container chamber having a side extrusion die, which comprises, placing a billet which is undersized by at least 25% in the container, first compressing the billet to shorten it to fill the container throughout the billet length, and continuing the compression and applying twist to the billet to extrude the material of the billet through the side die.

References Cited by the Examiner

UNITED STATES PATENTS

| | | | |
|---|---|---|---|
| 1,109,555 | 9/1914 | Summey | 72—259 |
| 1,902,975 | 3/1933 | Sparks | 72—69 |
| 2,744,288 | 5/1956 | Fienber et al. | 25—102 |
| 2,974,790 | 3/1961 | Murphy | 72—259 |
| 3,059,768 | 10/1962 | Altwicker et al. | 72—273 |

FOREIGN PATENTS 505,815  12/1954  Italy.

CHARLES W. LANHAM, *Primary Examiner.*

H. D. HOINKES, *Assistant Examiner.*